US012587299B2

(12) United States Patent
Hayakawa et al.

(10) Patent No.: US 12,587,299 B2
(45) Date of Patent: Mar. 24, 2026

(54) OPTICAL COMMUNICATION DEVICE

(71) Applicant: Mitsubishi Electric Corporation, Tokyo (JP)

(72) Inventors: Ryo Hayakawa, Tokyo (JP); Kenji Ishii, Tokyo (JP); Kiyoshi Onohara, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 19/106,374

(22) PCT Filed: Sep. 7, 2022

(86) PCT No.: PCT/JP2022/033516
§ 371 (c)(1),
(2) Date: Feb. 25, 2025

(87) PCT Pub. No.: WO2024/053001
PCT Pub. Date: Mar. 14, 2024

(65) Prior Publication Data
US 2026/0005781 A1      Jan. 1, 2026

(51) Int. Cl.
*H04B 10/40*          (2013.01)
*H04B 10/69*          (2013.01)
(Continued)

(52) U.S. Cl.
CPC .............. *H04J 14/02* (2013.01); *H04B 10/40* (2013.01); *H04B 10/69* (2013.01); *H04J 14/08* (2013.01); *H04Q 11/0067* (2013.01)

(58) Field of Classification Search
CPC ................................ H04B 10/40; H04B 10/69
See application file for complete search history.

(56) References Cited

U.S. PATENT DOCUMENTS 6,127,953 A * 10/2000 Manzardo ............... H03M 7/30
                                                              341/87
8,374,504 B2 * 2/2013 Mizutani ............. H04J 14/0282
                                                              398/71
(Continued)

FOREIGN PATENT DOCUMENTS

EP          2281352 B1      2/2011
EP          2615800 A1      7/2013
(Continued)

OTHER PUBLICATIONS

Kawabata et al., NTT, "Network Service Technology Realized by APN", NTT Technical Journal, Aug. 2021, vol./No. 33(8), in 6 pages.

(Continued)

*Primary Examiner* — Nathan M Cors
(74) *Attorney, Agent, or Firm* — PROCOPIO, CORY, HARGREAVES & SAVITCH LLP

(57) ABSTRACT

An optical communication device includes a signal multiplexing unit that multiplexes a plurality of client signals and a signal transmission unit that converts a first multiplexed signal obtained by the multiplexing to an optical signal and transmits the optical signal. The optical communication device is a device capable of receiving data traffic greater than data traffic corresponding to a predetermined communication bandwidth.

5 Claims, 10 Drawing Sheets

(51) Int. Cl.
　　*H04J 14/02*　　　(2006.01)
　　*H04J 14/08*　　　(2006.01)
　　*H04Q 11/00*　　　(2006.01)

(56)　　　　References Cited

U.S. PATENT DOCUMENTS

| | | | | |
|---|---|---|---|---|
| 2008/0298806 | A1 * | 12/2008 | Effenberger ........ | H04J 14/0226 |
| | | | | 398/98 |
| 2010/0290783 | A1 * | 11/2010 | Kazawa ............. | H04Q 11/0067 |
| | | | | 398/66 |
| 2012/0148246 | A1 * | 6/2012 | Mukai .............. | H04L 12/40013 |
| | | | | 398/58 |

FOREIGN PATENT DOCUMENTS

| | | | |
|---|---|---|---|
| JP | 2013-110771 | A | 6/2013 |
| JP | 2014-57192 | A | 3/2014 |
| JP | 2018-113588 | A | 7/2018 |
| WO | 2011/021307 | A1 | 2/2011 |

OTHER PUBLICATIONS

Patent Cooperation Treaty, International Search Report, Application No. PCT/JP2022/033516, dated Nov. 15, 2022, in 4 pages.
Patent Cooperation Treaty, Written Opinion, Application No. PCT/JP2022/033516, dated Nov. 15, 2022, in 7 pages.
European Patent Office, Extended European Search Report, Application No. 22958080.8, dated Oct. 14, 2025, in 11 pages.

* cited by examiner

OPTICAL COMMUNICATION DEVICE

CROSS-REFERENCE TO RELATED APPLICATIONS

This application is a US National Stage of International Patent Application PCT/JP2022/033516, filed on Sep. 7, 2022, the contents of which are incorporated herein by reference.

TECHNICAL FIELD

The present disclosure relates to an optical communication device.

BACKGROUND ART

In next-generation mobile communication systems in conformity with B5G/6G or the like, broadband wireless communication using small cells is executed. Further, a huge amount of data communication is being required of the next-generation mobile communication systems. In such a circumstance, All Photonics Network (APN) has been proposed. The APN is described in Non-patent Reference 1.

A network in which a huge amount of data communication is executed includes Wavelength Division Multiplexing (WDM) optical communication devices. The WDM optical communication device includes a muxponder. The muxponder converts a low-speed client signal based on Ethernet (registered trademark), Synchronous Digital Hierarchy (SDH) or the like to a high-speed signal suitable for WDM communication. The APN includes WDM optical communication devices including muxponders.

A communication range of a base station in B5G/6G is narrow. Therefore, a plurality of base stations is installed. However, when a plurality of base stations has been installed, there appears a base station not executing communication out of the plurality of base stations. For example, when four base stations have been installed in a certain area, the number of base stations communicating with a user is one. Accordingly, three base stations are set in a no-signal state as a state of not executing communication. As above, when a plurality of base stations is installed, there is a fear of an increase in the no-signal state. Thus, it increases situations where the communication bandwidth cannot be effectively used, and the operation of the optical communication device becomes inefficient.

In a Passive Optical Network (PON) system, there are cases where an ONU transmits empty frames including no user data. When the ONU transmits empty frames, the effective use of the communication bandwidth is not achieved. To deal with this problem, there has been proposed a technology in which a device in Patent Reference 1 determines the presence/absence of a data signal contained in a frame and disconnects a logical link determined to be carrying no data signal out of a plurality of logical links (see Patent Reference 1).

PRIOR ART REFERENCE

Patent Reference

Patent Reference 1: Japanese Patent Application Publication No. 2018-113588

Non-Patent Reference

Non-patent Reference 1: NTT, "Network Service Technology Realized by APN", NTT Technical Journal, August 2021

SUMMARY OF THE INVENTION

Problem to be Solved by the Invention

Additionally, there exists an optical communication device that transmits a multiplexed signal obtained by multiplexing a plurality of client signals. Further, this optical communication device is a device capable of receiving data traffic corresponding to a predetermined communication bandwidth. For example, this optical communication device is a device capable of receiving data traffic corresponding to a communication bandwidth "100 Gbit/sec".

Incidentally, there are case where a client signal as an empty frame is transmitted to the optical communication device. In such cases, the communication traffic of the multiplexed signal is lower than the predetermined communication bandwidth. The low communication traffic means that the effective use of the communication bandwidth is not achieved.

An object of the present disclosure is to make the effective use of the communication bandwidth.

Means for Solving the Problem

An optical communication device according to an aspect of the present disclosure is provided. The optical communication device includes a signal multiplexing unit that multiplexes a plurality of client signals and a signal transmission unit that converts a first multiplexed signal obtained by the multiplexing to an optical signal and transmits the optical signal. The optical communication device is a device capable of receiving data traffic greater than data traffic corresponding to a predetermined communication bandwidth.

Effect of the Invention

According to the present disclosure, the effective use of the communication bandwidth can be achieved.

BRIEF DESCRIPTION OF THE DRAWINGS

FIG. 7 is a block diagram showing functions of the transmission signal processing unit in a second embodiment.

FIG. 9 is a diagram showing a concrete example of a process executed by the transmission signal processing unit in the second embodiment.

FIG. 10 is a diagram showing a concrete example of a process executed by the reception signal processing unit in the second embodiment.

MODE FOR CARRYING OUT THE INVENTION

Embodiments will be described below with reference to the drawings. The following embodiments are just examples and a variety of modifications are possible within the scope of the present disclosure.

First Embodiment

Figure 1:
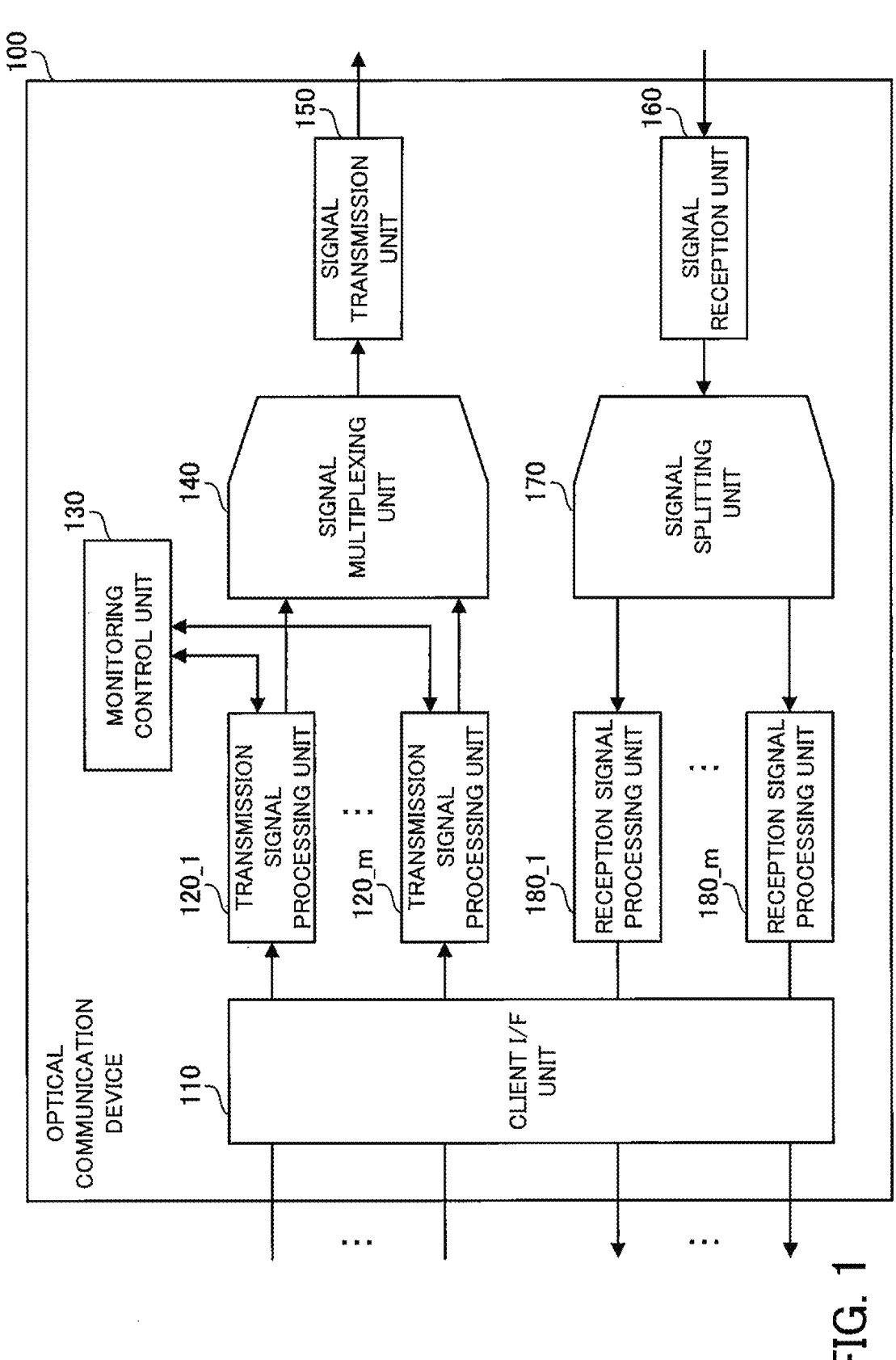
FIG. 1 is a block diagram showing functions of an optical communication device in a first embodiment.

FIG. 1 is a block diagram showing functions of an optical communication device in a first embodiment. The optical communication device 100 includes a client Interface (I/F) unit 110, transmission signal processing units 120_1, . . . , 120_m (m is a positive integer), a monitoring control unit 130, a signal multiplexing unit 140, a signal transmission unit 150, a signal reception unit 160, a signal splitting unit 170, and reception signal processing units 180_1, . . . , 180_m. Further, the optical communication device 100 may be implemented by a muxponder.

Here, the optical communication device 100 will be described briefly. The optical communication device 100 is capable of receiving a plurality of client signals. The optical communication device 100 is a device capable of receiving data traffic greater than data traffic corresponding to a predetermined communication bandwidth. For example, the predetermined communication bandwidth is assumed to be 100 Gbit/sec. The communication bandwidth of the client signal is assumed to be 10 Gbit/sec. When the number of client signals is 20, the optical communication device 100 receives data traffic corresponding to 200 Gbit/sec. Therefore, when the optical communication device 100 receives 20 client signals, the optical communication device 100 receives data traffic greater than the data traffic corresponding to the communication bandwidth 100 Gbit/sec. For example, in order to receive great data traffic, the optical communication device 100 includes the same number of transmission signal processing units as the client signals to be received. Incidentally, there are cases where the optical communication device 100 receives client signals being empty frames. For example, even when 10 client signals out of the 20 client signals are empty frames, the optical communication device 100 is capable of transmitting communication traffic corresponding to the predetermined communication bandwidth. In short, the optical communication device 100 is capable of transmitting data at 100 Gbit/sec. Since the optical communication device 100 is capable of receiving data traffic greater than the data traffic corresponding to the predetermined communication bandwidth as above, the optical communication device 100 is capable of making the effective use of the communication bandwidth even when client signals being empty frames are received.

As described above, there are cases where the optical communication device 100 receives data traffic greater than the data traffic corresponding to the predetermined communication bandwidth. Therefore, when the received data traffic exceeds the data traffic corresponding to the communication bandwidth, the optical communication device 100 adjusts the communication traffic to the communication bandwidth. Then, data not included in the communication traffic is stored in a buffer. For example, the communication bandwidth is assumed to be 100 Gbit/sec. The optical communication device 100 is assumed to receive data traffic corresponding to 150 Gbit/sec. The optical communication device 100 multiplexes a plurality of client signals corresponding to the data traffic corresponding to 100 Gbit/sec and transmits the multiplexed signal. Further, the optical communication device 100 stores data traffic corresponding to 50 Gbit/sec in the buffer. Since the communication traffic is adjusted to the communication bandwidth as above, the optical communication device 100 is capable of transmitting data at the communication bandwidth. The following description will be given mainly of such features.

In the following description, the transmission signal processing units 120_1, . . . , 120_m can be collectively referred to as transmission signal processing units 120. The reception signal processing units 180_1, . . . , 180_m can be collectively referred to as reception signal processing units 180.

Part or all of the client I/F unit 110, the transmission signal processing units 120, the monitoring control unit 130, the signal multiplexing unit 140, the signal transmission unit 150, the signal reception unit 160, the signal splitting unit 170 and the reception signal processing units 180 may be implemented by processing circuitry.

The client I/F unit 110 receives m client signals each at a communication rate n. Incidentally, the client signals are signals transmitted from a client device. Illustration of the client device is left out. Further, the client I/F unit 110 transmits m client signals to the client device. Here, each client signal is referred to also as a frame.

Next, the transmission signal processing unit 120 will be described below.

Figure 2:
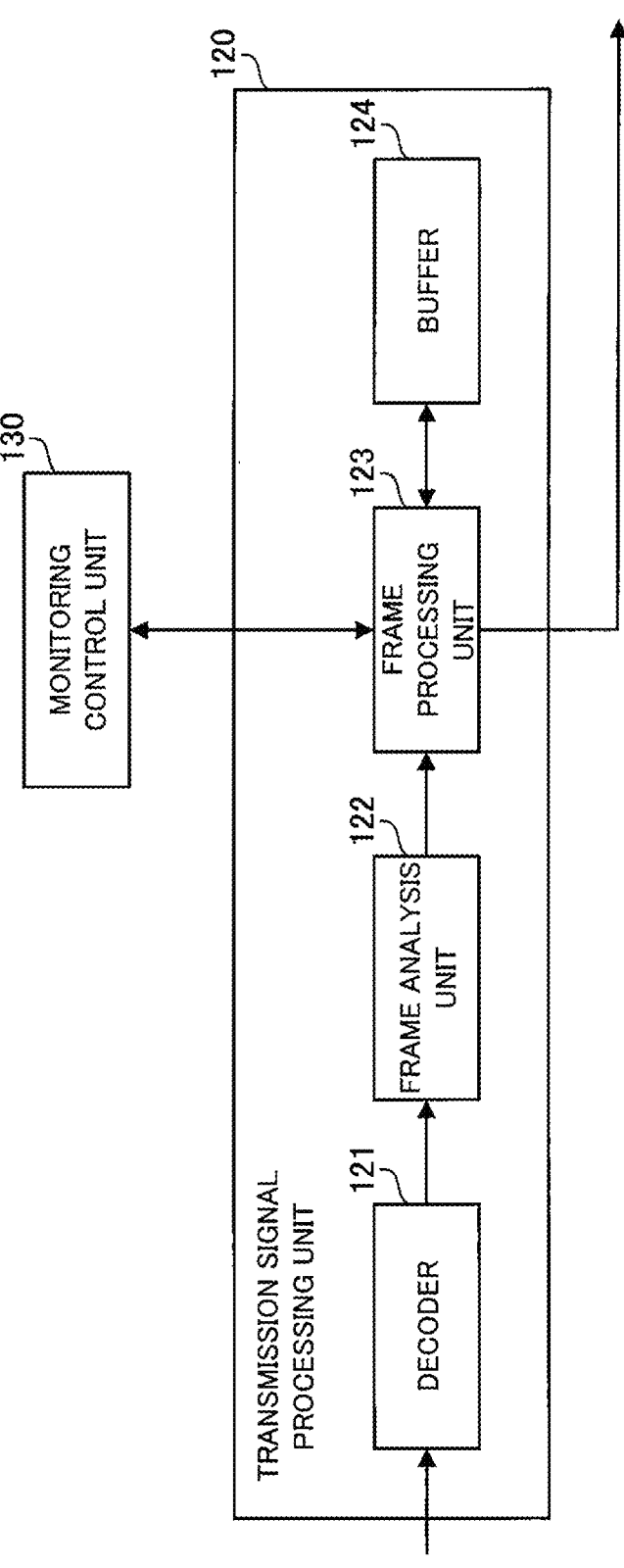
FIG. 2 is a block diagram showing functions of a transmission signal processing unit in the first embodiment.

FIG. 2 is a block diagram showing functions of the transmission signal processing unit in the first embodiment. The transmission signal processing unit 120 includes a decoder 121, a frame analysis unit 122, a frame processing unit 123 and a buffer 124.

The decoder 121 decodes the client signal. For example, the decoder 121 decodes the client signal encoded according to 8B/10B, 64B/66B or the like.

The frame analysis unit 122 analyzes data size of the client signal obtained by the decoding.

The frame processing unit 123 stores the client signal in the buffer 124.

The buffer 124 stores the client signal.

As above, the transmission signal processing units 120_1, . . . , 120_m store a plurality of client signals received by the optical communication device 100 in a plurality of buffers. Here, the plurality of buffers may also exist outside the transmission signal processing units 120_1, . . . , 120_m. Further, the plurality of buffers existing outside may be integrated into one buffer. Thus, it can also be expressed that the transmission signal processing units 120_1, . . . , 120_m store a plurality of client signals received by the optical communication device 100 in one or more buffers.

Next, returning to FIG. 1, the monitoring control unit 130 will be described below.

The monitoring control unit 130 obtains the data traffic (data amount) of the plurality of client signals stored in the one or more buffers. The monitoring control unit 130 judges whether or not the obtained data traffic exceeds the data traffic corresponding to the predetermined communication bandwidth. For example, the monitoring control unit 130 judges whether or not the obtained data traffic exceeds the data traffic corresponding to the predetermined communication bandwidth "100 Gbit/sec". When the obtained data traffic exceeds the data traffic corresponding to the predetermined communication bandwidth, the monitoring control unit 130 issues a command so as to transmit a plurality of client signals corresponding to the data traffic corresponding to the communication bandwidth to the signal multiplexing unit 140.

Upon receiving the command, the transmission signal processing units 120_1, . . . , 120__m_ transmit the plurality of client signals corresponding to the data traffic corresponding to the communication bandwidth stored in the one or more buffers to the signal multiplexing unit 140. Specifically, the transmission signal processing units 120_1, . . . , 120__m_ acquire the plurality of client signals corresponding to the data traffic corresponding to the communication bandwidth from the one or more buffers. For example, the transmission signal processing units 120_1, . . . , 120__m_ acquire the plurality of client signals corresponding to the data traffic corresponding to the communication bandwidth "100 Gbit/sec" from the one or more buffers. The method of acquiring the plurality of client signals corresponding to the data traffic can be any kind of method. For example, when there exist 10 buffers, the transmission signal processing units 120_1, . . . , 120__m_ acquire the plurality of client signals corresponding to the data traffic corresponding to "10 Gbit/sec" from the 10 buffers.

The signal multiplexing unit 140 multiplexes the plurality of client signals transmitted from the transmission signal processing units 120_1 to 120__m_. The multiplexed signal obtained by multiplexing the plurality of client signals is referred to also as a first multiplexed signal.

The signal transmission unit 150 performs a scramble process, an error correction encoding process and a transmission encoding process on the multiplexed signal. After finishing these processes, the signal transmission unit 150 converts the multiplexed signal to an optical signal. Here, the optical signal may be referred also to as a line signal. The signal transmission unit 150 transmits the optical signal to an optical transmission line.

The signal reception unit 160 receives an optical signal from the optical transmission line. The signal reception unit 160 converts the optical signal to an electric signal. By this, the signal reception unit 160 acquires a multiplexed signal (i.e., an electric signal). The signal reception unit 160 performs a transmission decoding process, an error correction decoding process, and a descramble process on the multiplexed signal. Here, this multiplexed signal is referred to also as a second multiplexed signal.

The signal splitting unit 170 splits the multiplexed signal. By this, m electric signals are inputted to the reception signal processing units 180_1 to 180__m_.

Next, the reception signal processing unit 180 will be described below.

Figure 3:
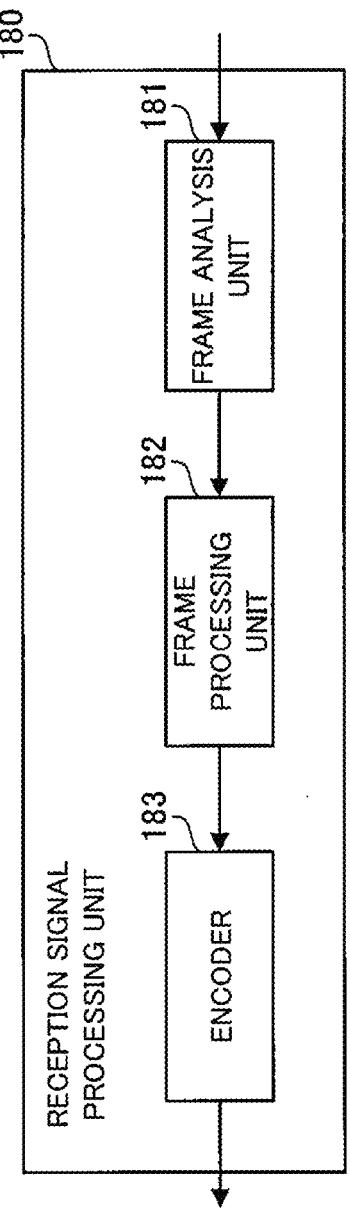
FIG. 3 is a block diagram showing functions of a reception signal processing unit in the first embodiment.

FIG. 3 is a block diagram showing functions of the reception signal processing unit in the first embodiment. The reception signal processing unit 180 includes a frame analysis unit 181, a frame processing unit 182 and an encoder 183.

The frame analysis unit 181 analyzes boundaries of frames included in the inputted electric signal. Here, this electric signal is referred to also as a first electric signal.

The frame processing unit 182 splits the electric signal based on the boundaries of the frames. Each electric signal obtained by the splitting is referred to also as a frame or a client signal. In the following description, each electric signal obtained by the splitting is referred to as a frame. The frame processing unit 182 transmits the frames to the encoder 183 in consideration of a time represented by a packet gap. In other words, the frame processing unit 182 transmits the frames to the encoder 183 while securing spacing of the packet gap. For example, the frame processing unit 182 transmits a first frame to the encoder 183. The frame processing unit 182 stays on standby for the time represented by the packet gap. The frame processing unit 182 transmits a second frame to the encoder 183.

The encoder 183 encodes the frames. For example, the encoder 183 performs encoding according to 8B/10B, 64B/66B or the like on the frames. The encoder 183 transmits the encoded frames to the client I/F unit 110.

Next, a process executed by the transmission signal processing unit 120 will be described below by using a concrete example.

Figure 4:
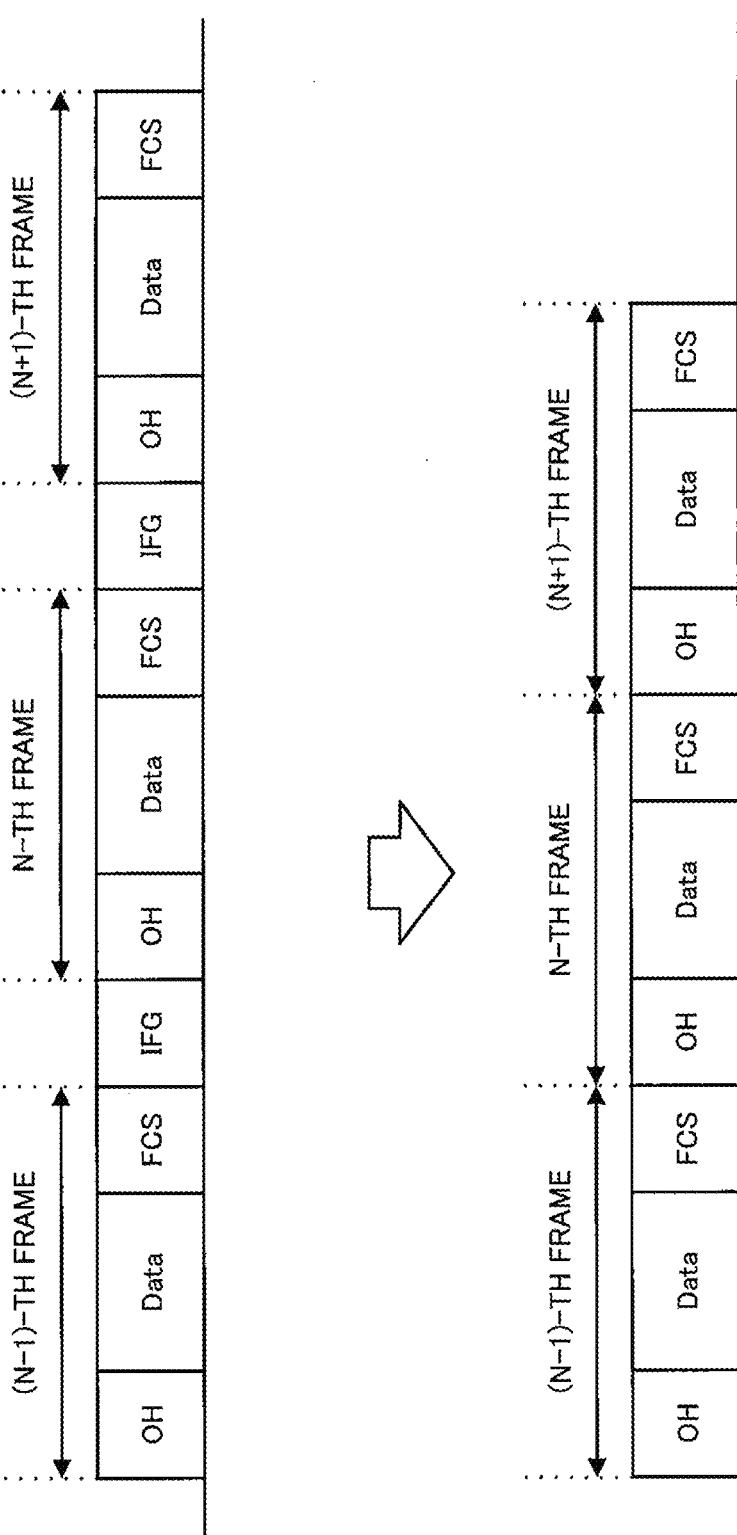
FIG. 4 is a diagram showing a concrete example of a process executed by the transmission signal processing unit in the first embodiment.

FIG. 4 is a diagram showing a concrete example of the process executed by the transmission signal processing unit in the first embodiment. FIG. 4 will be explained by using an Ethernet. The explanation of FIG. 4 will be given by using frames. As mentioned earlier, a frame is referred to also as a client signal.

FIG. 4 shows a case where an (N−1)-th, an N-th and an (N+1)-th frames are inputted to the transmission signal processing unit 120. Specifically, after the (N−1)-th frame is inputted to the transmission signal processing unit 120, the transmission signal processing unit 120 stays on standby for the time represented by the packet gap as an Interframe Gap (IFG). Then, the N-th frame is inputted to the transmission signal processing unit 120. After the N-th frame is inputted to the transmission signal processing unit 120, the transmission signal processing unit 120 stays on standby for the time represented by the packet gap. Then, the (N+1)-th frame is inputted to the transmission signal processing unit 120.

Here, the format of the frame will be described below. The frame includes an OverHead (OH), Data, and a Frame Check Sequence (FCS).

The (N−1)-th, the N-th and the (N+1)-th frames are stored in the buffer 124.

Next, a process executed by the reception signal processing unit 180 will be described below by using a concrete example.

Figure 5:
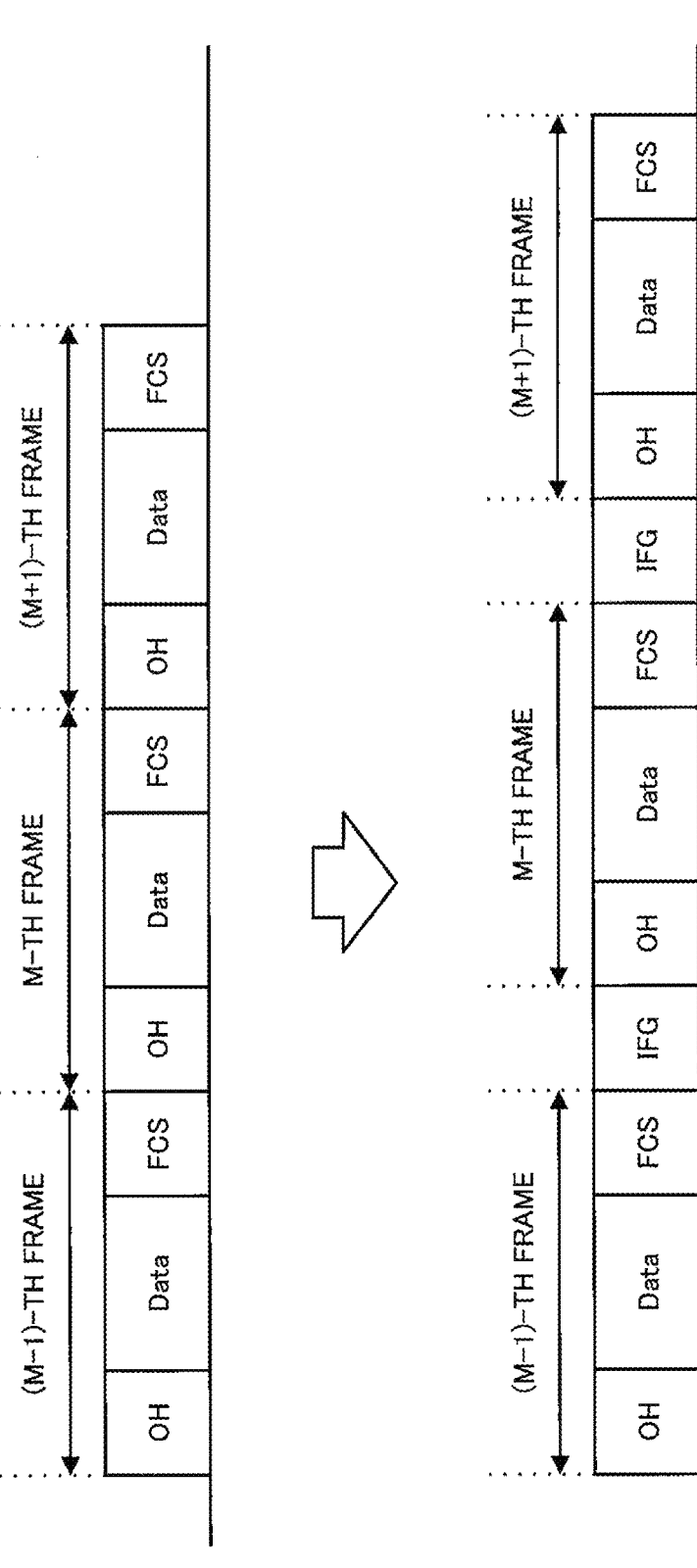
FIG. 5 is a diagram showing a concrete example of a process executed by the reception signal processing unit in the first embodiment.

FIG. 5 is a diagram showing a concrete example of the process executed by the reception signal processing unit in the first embodiment. FIG. 5 will be explained by using an Ethernet.

The frame analysis unit 181 analyzes the boundaries of the frames included in the inputted electric signal. For example, the frame analysis unit 181 detects a border between an FCS and an OH as the boundary of the frame.

The frame processing unit 182 splits the electric signal based on the boundaries of the frames. By this, the electric signal is split into an (M−1)-th, an M-th and an (M+1)-th frames.

The frame processing unit 182 transmits the (M−1)-th frame to the encoder 183. The frame processing unit 182 stays on standby for the time represented by the packet gap as the IFG. The frame processing unit 182 transmits the M-th frame to the encoder 183. The frame processing unit 182 stays on standby for the time represented by the packet gap. The frame processing unit 182 transmits the (M+1)-th frame to the encoder 183.

Next, a process executed by the optical communication device 100 will be described below by using a flowchart.

Figure 6:
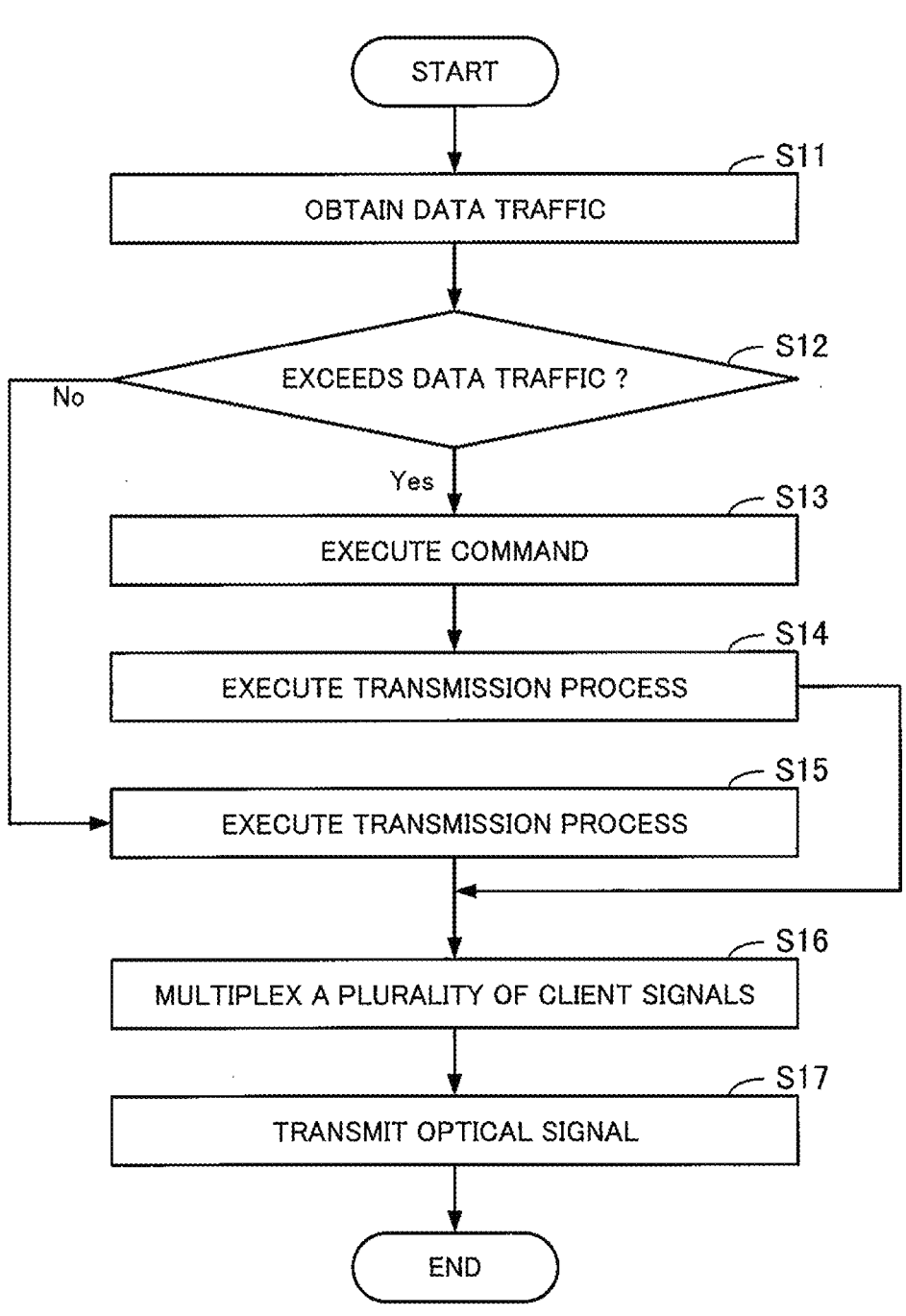
FIG. 6 is a flowchart showing an example of a process executed by the optical communication device in the first embodiment.

FIG. 6 is a flowchart showing an example of the process executed by the optical communication device in the first embodiment.

(Step S11) The monitoring control unit 130 obtains the data traffic (data amount) of the plurality of client signals stored in the one or more buffers.

(Step S12) The monitoring control unit 130 judges whether or not the obtained data traffic exceeds the data traffic corresponding to the predetermined communication bandwidth. If the condition is satisfied, the process advances to step S13. If the condition is not satisfied, the process advances to step S15.

(Step S13) The monitoring control unit 130 issues a command so as to transmit a plurality of client signals corresponding to the data traffic corresponding to the communication bandwidth to the signal multiplexing unit 140.

(Step S14) The transmission signal processing units 120_1, . . . , 120_m transmit the plurality of client signals corresponding to the data traffic corresponding to the communication bandwidth stored in the one or more buffers to the signal multiplexing unit 140. Then, the process advances to step S16.

(Step S15) The transmission signal processing units 120_1, . . . , 120_m transmit the plurality of client signals stored in the one or more buffers to the signal multiplexing unit 140.

(Step S16) The signal multiplexing unit 140 multiplexes the plurality of client signals transmitted from the transmission signal processing units 120_1 to 120_m.

(Step S17) The signal transmission unit 150 converts the multiplexed signal, as the signals multiplexed together, to the optical signal and transmits the optical signal.

According to the first embodiment, the optical communication device 100 is capable of receiving data traffic greater than the data traffic corresponding to the predetermined communication bandwidth. Therefore, the optical communication device 100 is capable of making the effective use of the communication bandwidth.

Further, there are cases where the optical communication device 100 receives data traffic greater than the data traffic corresponding to the predetermined communication bandwidth. When the received data traffic exceeds the data traffic corresponding to the communication bandwidth, the optical communication device 100 adjusts the communication traffic to the communication bandwidth. Since the communication traffic is adjusted to the communication bandwidth, the optical communication device 100 is capable of transmitting data at the communication bandwidth.

Furthermore, the optical communication device 100 has the function of analyzing the boundaries between frames. Therefore, the optical communication device 100 splits a mass of frames. Accordingly, the optical communication device 100 is capable of acquiring data in units of frames.

Second Embodiment

Next, a second embodiment will be described below. In the second embodiment, the description will be given mainly of features different from those in the first embodiment. In the second embodiment, the description is omitted for features in common with the first embodiment.

In the second embodiment, a description will be given of a case where the optical communication device 100 has a data compression function and a data decompression function.

First, the transmission signal processing unit 120 will be described below.

Figure 7:
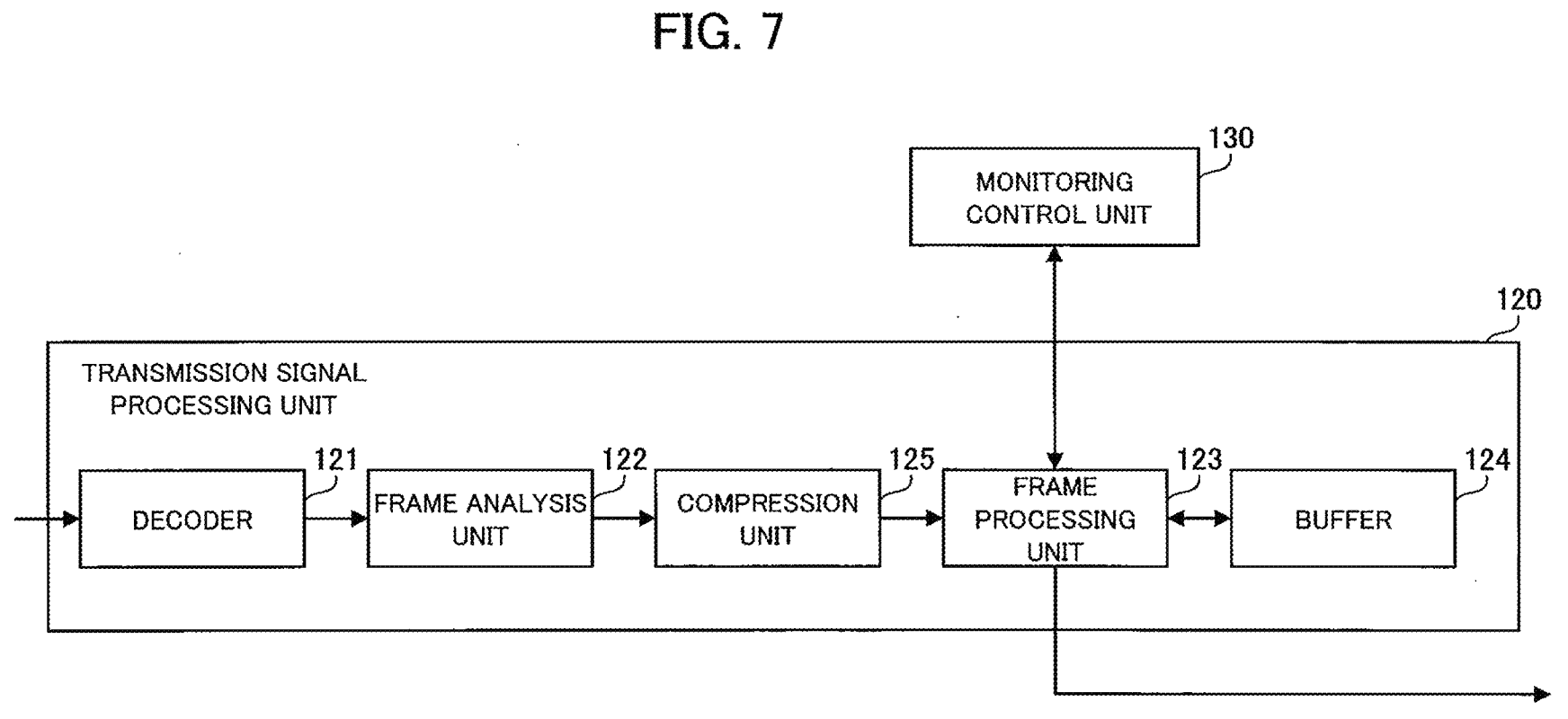

FIG. 7 is a block diagram showing functions of the transmission signal processing unit in the second embodiment. The transmission signal processing unit 120 further includes a compression unit 125.

The compression unit 125 compresses the client signal. The client signal after undergoing the compression is referred to as a compressed client signal. Incidentally, the compression is reversible compression.

The frame processing unit 123 stores the compressed client signal in the buffer 124.

As above, the transmission signal processing units 120_1, . . . , 120_m compress a plurality of client signals received by the optical communication device 100. The transmission signal processing units 120_1, . . . , 120_m store a plurality of compressed client signals in the one or more buffers.

When the data traffic (data amount) of the plurality of compressed client signals stored in the one or more buffers does not exceed the data traffic corresponding to the predetermined communication bandwidth, the signal multiplexing unit 140 multiplexes the plurality of compressed client signals stored in the buffers.

When the data traffic (data amount) of the plurality of compressed client signals stored in the one or more buffers exceeds the data traffic corresponding to the predetermined communication bandwidth, the monitoring control unit 130 issues a command so as to transmit a plurality of compressed client signals corresponding to the data traffic corresponding to the communication bandwidth to the signal multiplexing unit 140.

Upon receiving the command, the transmission signal processing units 120_1, . . . , 120_m transmit the plurality of compressed client signals corresponding to the data traffic corresponding to the communication bandwidth stored in the buffers to the signal multiplexing unit 140. The signal multiplexing unit 140 multiplexes the plurality of compressed client signals.

The signal transmission unit 150 converts the multiplexed signal to the optical signal and transmits the optical signal.

Next, the reception signal processing units 180 will be described below.

Figure 8:
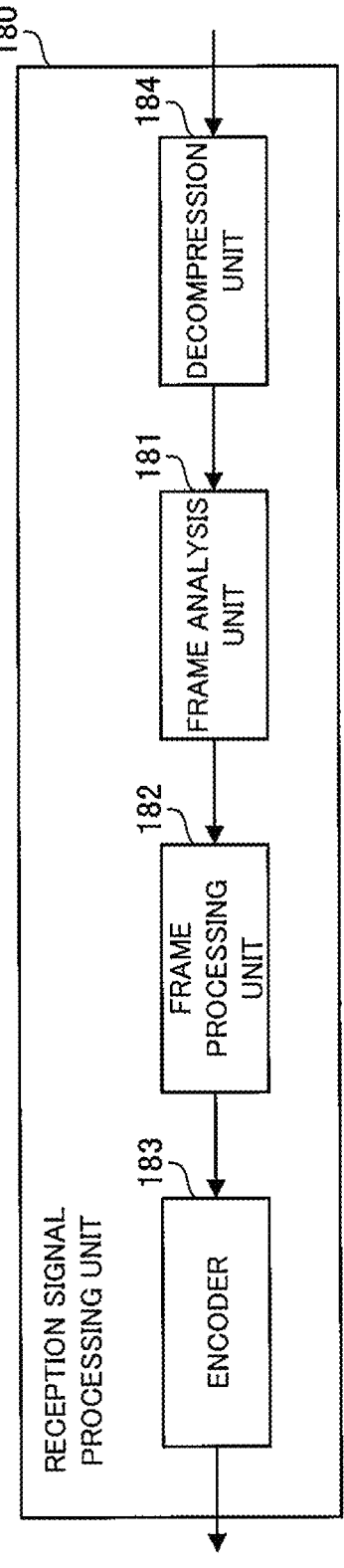
FIG. 8 is a block diagram showing functions of the reception processing unit in the second embodiment.

FIG. 8 is a block diagram showing functions of the reception signal processing unit in the second embodiment. The reception signal processing unit 180 further includes a decompression unit 184.

An electric signal obtained by the splitting by the signal splitting unit 170 is inputted to the decompression unit 184. This electric signal is compressed data. The decompression unit 184 decompresses the electric signal. The decompressed electric signal is inputted to the frame analysis unit 181. The subsequent processing is the same as that in the first embodiment. Thus, the description of the subsequent processing is left out.

Next, a process executed by the transmission signal processing unit 120 will be described below by using a concrete example.

Figure 9:
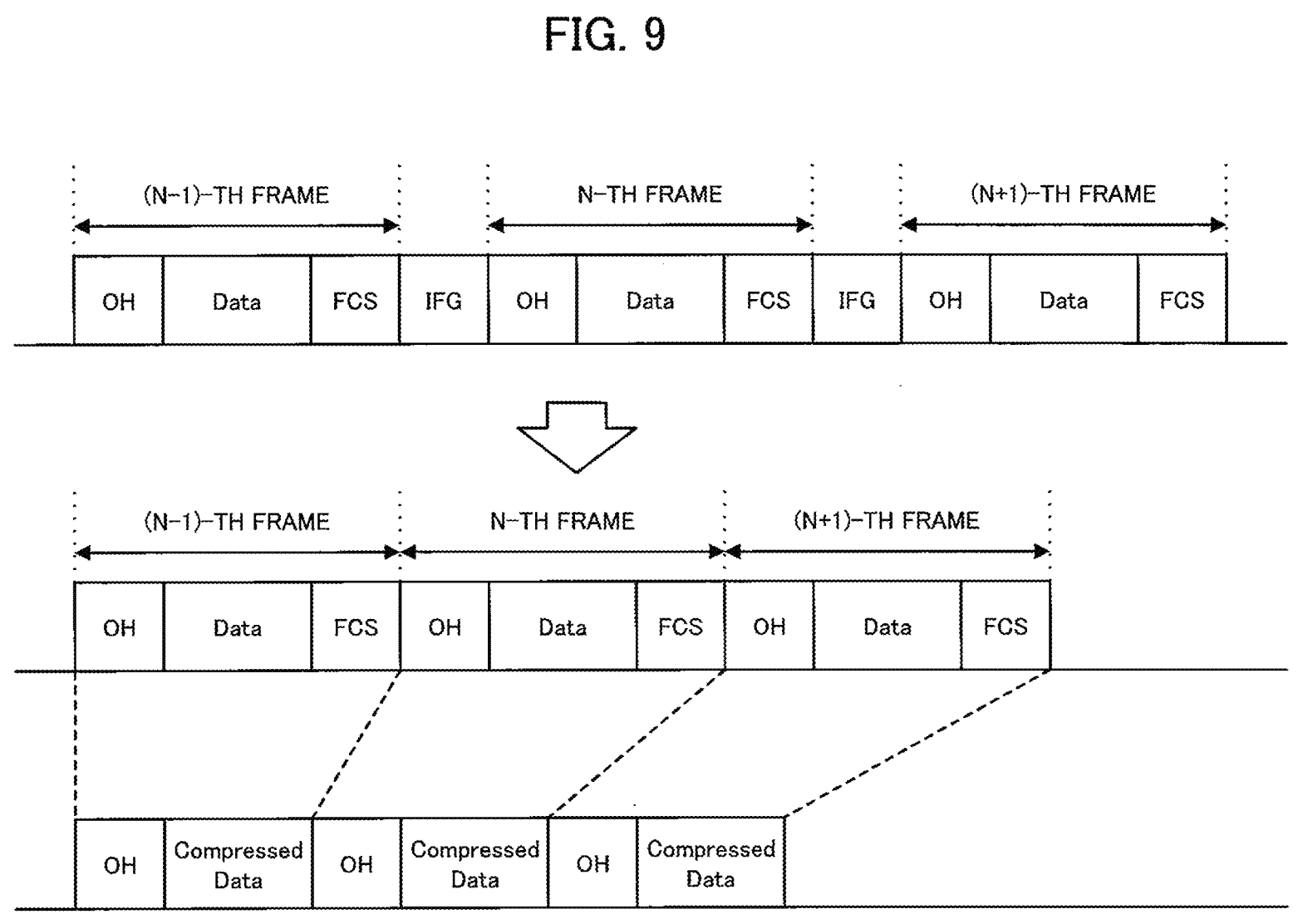

FIG. 9 is a diagram showing a concrete example of the process executed by the transmission signal processing unit in the second embodiment. FIG. 9 will be explained by using frames. As mentioned earlier, a frame is referred to also as a client signal.

When the (N−1)-th frame is inputted to the transmission signal processing unit 120, the transmission signal processing unit 120 compresses the (N−1)-th frame. When the N-th frame is inputted to the transmission signal processing unit 120, the transmission signal processing unit 120 compresses the N-th frame. When the (N+1)-th frame is inputted to the transmission signal processing unit 120, the transmission signal processing unit 120 compresses the (N+1)-th frame.

Accordingly, the data traffic stored in the buffer 124 decreases.

Next, a process executed by the reception signal processing unit 180 will be described below by using a concrete example.

Figure 10:
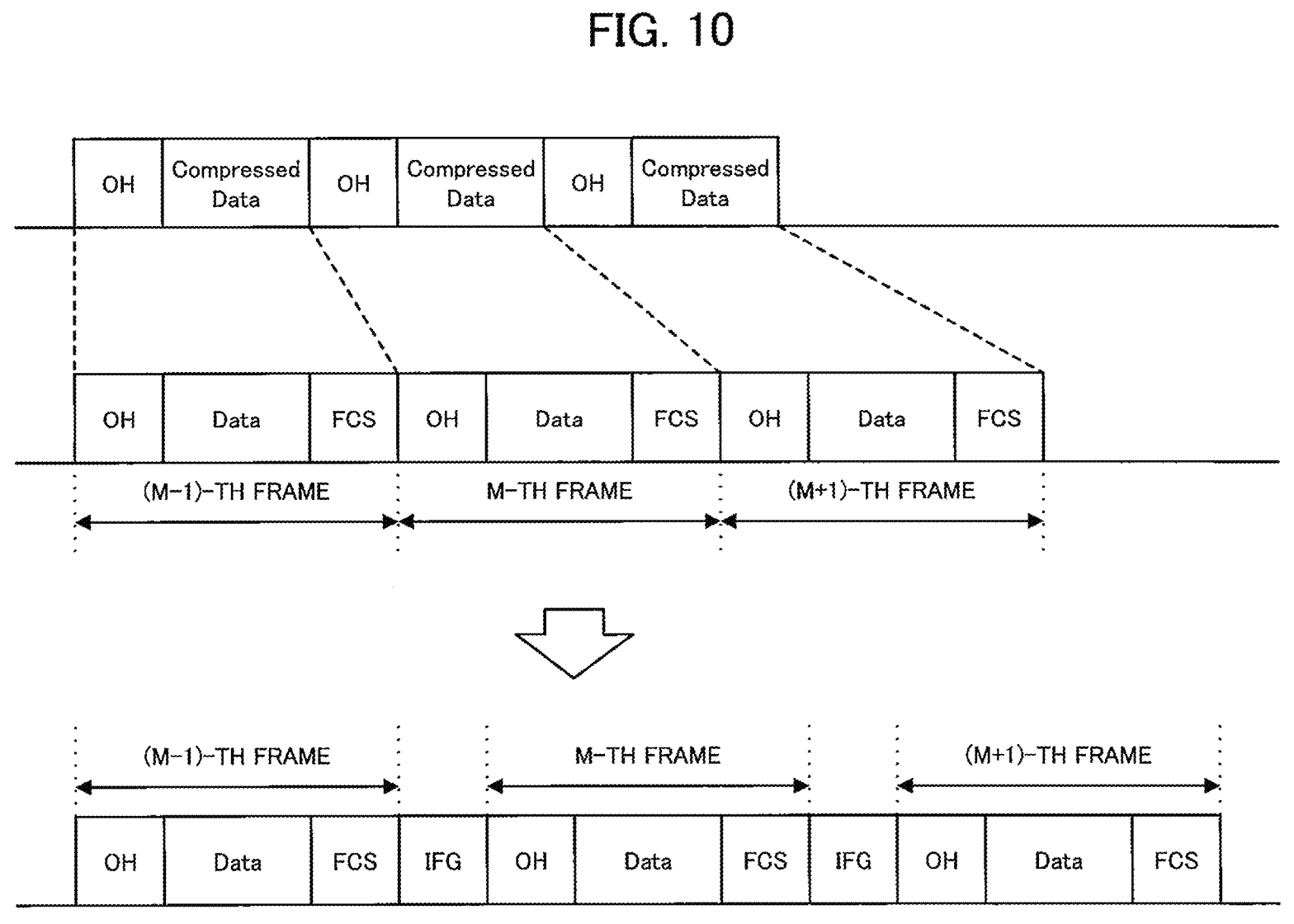

FIG. 10 is a diagram showing a concrete example of the process executed by the reception signal processing unit in the second embodiment. The decompression unit 184 decompresses the electric signal inputted thereto. Accordingly, the electric signal is decompressed. FIG. 10 indicates that the decompressed electric signal includes the (M−1)-th frame, the M-th frame and the (M+1)-th frame.

According to the second embodiment, the optical communication device 100 compresses data, and thus is capable of transmitting a greater amount of data.

Further, when the data traffic of the plurality of compressed client signals exceeds the data traffic corresponding to the predetermined communication bandwidth, the optical communication device 100 adjusts the communication traffic to the communication bandwidth. Since the communication traffic is adjusted to the communication bandwidth, the optical communication device 100 is capable of transmitting data at the communication bandwidth.

Furthermore, the optical communication device 100 has the decompression function. Therefore, upon receiving compressed data, the optical communication device 100 decompresses the compressed data. Then, the optical communication device 100 splits a mass of frames. Accordingly, the optical communication device 100 is capable of acquiring data in units of frames.

Features in the embodiments described above can be appropriately combined with each other.

DESCRIPTION OF REFERENCE CHARACTERS

100: optical communication device, 110: client I/F unit, 120: transmission signal processing unit, 121: decoder, 122: frame analysis unit, 123: frame processing unit, 124: buffer, 125: compression unit, 130: monitoring control unit, 140: signal multiplexing unit, 150: signal transmission unit, 160: signal reception unit, 170: signal splitting unit, 180: reception signal processing unit, 181: frame analysis unit, 182: frame processing unit, 183: encoder, 184: decompression unit

What is claimed is:

1. An optical communication device comprising:
signal multiplexing circuitry to multiplex a plurality of client signals;
signal transmitting circuitry to convert a first multiplexed signal obtained by the multiplexing to an optical signal and transmit the optical signal;
signal receiving circuitry to receive an optical signal including a second multiplexed signal;
frame analyzing circuitry to analyze a boundary of frames included in a first electric signal as one electric signal among a plurality of electric signals obtained by splitting the second multiplexed signal;
frame processing circuitry to split the first electric signal based on the boundary of the frames; and
an encoder to encode the frames obtained by the splitting, wherein
the optical communication device is a device capable of receiving data traffic greater than data traffic corresponding to a predetermined communication bandwidth, and the frame processing circuitry transmits the frames to the encoder in consideration of a time represented by a packet gap.

2. The optical communication device according to claim 1, further comprising:
a plurality of transmission signal processing circuitry to store a plurality of client signals received by the optical communication device in one or more buffers; and
monitoring control circuitry to issue a command so as to transmit a plurality of client signals corresponding to the data traffic corresponding to the communication bandwidth to the signal multiplexing circuitry when the data traffic of the plurality of client signals stored in the buffers exceeds the data traffic corresponding to the communication bandwidth,
wherein
when the plurality of transmission signal processing circuitry receives the command, the plurality of transmission signal processing circuitry transmit the plurality of client signals corresponding to the data traffic corresponding to the communication bandwidth stored in the buffers to the signal multiplexing circuitry.

3. The optical communication device according to claim 2, wherein
the plurality of transmission signal processing circuitry compresses the plurality of client signals received by the optical communication device and stores a plurality of compressed client signals obtained by the compression in the buffers, and
when the data traffic of the plurality of compressed client signals stored in the buffers does not exceed the data traffic corresponding to the communication bandwidth, the signal multiplexing circuitry multiplexes the plurality of compressed client signals stored in the buffers.

4. The optical communication device according to claim 3, wherein
the monitoring control circuitry issues a command so as to transmit a plurality of compressed client signals corresponding to the data traffic corresponding to the communication bandwidth to the signal multiplexing circuitry when the data traffic of the plurality of compressed client signals stored in the buffers exceeds the data traffic corresponding to the communication bandwidth,
when the plurality of transmission signal processing circuitry receives the command, the plurality of transmission signal processing circuitry transmits the plurality of compressed client signals corresponding to the data traffic corresponding to the communication bandwidth stored in the buffers to the signal multiplexing circuitry, and
the signal multiplexing circuitry multiplexes the plurality of compressed client signals transmitted thereto.

5. The optical communication device according to claim 1, further comprising decompressing circuitry to decompress the first electric signal as compressed data.

* * * * *